United States Patent [19]

Davis

[11] Patent Number: 4,891,638
[45] Date of Patent: Jan. 2, 1990

[54] NATIONWIDE DISPLAY PAGER WITH LOCATION READOUT

[75] Inventor: Walter L. Davis, Coral Springs, Fla.

[73] Assignee: Motorola, Inc., Schaumburg, Ill.

[21] Appl. No.: 114,923

[22] Filed: Oct. 30, 1987

[51] Int. Cl.$^4$ .............................................. H04Q 7/00
[52] U.S. Cl. ............................... 340/825.440; 158/158; 158/34
[58] Field of Search ............... 340/825.44, 825.49, 340/825.47; 455/34, 32, 151, 154, 186, 179, 158

[56] References Cited

U.S. PATENT DOCUMENTS

| | | | |
|---|---|---|---|
| 4,287,599 | 9/1981 | Goncharoff et al. | 455/158 |
| 4,392,246 | 7/1983 | Niioka et al. | 455/158 |
| 4,644,347 | 2/1987 | Lucas et al. | 340/825.44 |
| 4,713,808 | 12/1987 | Gaskill et al. | 370/94 |
| 4,734,694 | 3/1988 | Umetsu et al. | 340/825.44 |

Primary Examiner—Donald J. Yusko
Assistant Examiner—Edwin C. Holloway, III
Attorney, Agent, or Firm—Philip P. Macnak; Vincent B. Ingrassia

[57] ABSTRACT

A selective call receiver for receiving and displaying information in a nationwide communication system includes circuitry to decode and process transmitted channel identification information. The receiver displays channel identification indicia in response to a user interrogation thereby confirming proper operation of the receiver on the system at the expected location.

13 Claims, 4 Drawing Sheets

FLOW CHART FOR LOCATION IDENTIFICATION FOR SIGNALLING SCHEME THAT USES LOCAL OR NATION WIDE FORMATS

FLOW CHART FOR LOCATION IDENTIFICATION FOR SIGNALLING SCHEME IN WHICH EACH CITY HAS A SYSTEM I.D. CODE

NATIONWIDE DISPLAY PAGER WITH LOCATION READOUT

FIELD OF THE INVENTION

The present invention relates to nationwide selective call receivers with information display and more particularly to nationwide multiple frequency display receivers with frequency switching means which enables the receiver to selectively receive one of a plurality of frequencies and identify the corresponding location by an appropriate display.

DESCRIPTION OF THE PRIOR ART

There have been several proposals for nationwide selective call systems operating on a number of different frequencies. The FCC proposals include the concept of predetermined nationwide frequencies and also the provision for transmitting paging messages on the subcarriers of the commercial broadcast FM stations (88–108 MHz). With the FCC approval of either or both of the proposals, it would be desirable to provide a receiver which is capable of selectively receiving either the local frequency signal or the nationwide frequency signal or, in the case of subcarrier transmission, the commercial broadcast FM frequencies. More importantly, it is desirable to have such a receiver, whether multifrequency or not, indicate to the user that it is functioning properly by identifying the signaling system corresponding to the perceived location of the receiver.

However, none of the proposed systems address a key need of the customer who uses nationwide paging. That is, as the customer travels from city to city around the country, how does one know that one's pager is working properly and is correctly decoding the signaling system used in that city?. The present invention solves this problem by providing a readout on the display of a display pager at least in response to a user interrogation that indicates the status of the pager, i.e. whether it is decoding the home system or the city in which the paging receiver is presently located.

SUMMARY OF THE INVENTION

It is therefore an object of the present invention to provide a selective call receiver which is capable of selectively receiving and displaying transmitted location indicia.

It is another object of the present invention to provide a selective call receiver which is capable of selectively receiving and displaying location indicia which are transmitted at different frequencies.

It is yet another object of the present invention to provide a selective call display receiver having a frequency switching means which automatically selects the frequency at which the receiver operates and provides a readout on the display to indicate the receiver's location.

It is still another object of the present invention to provide a selective call display receiver which automatically switches from a local frequency to a nationwide frequency and vice versa in accordance with a transmitted coded message signal and displays a decoded code message to indicate location and receiver status.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

The preferred embodiment operating system for the present invention is described in U.S. Pat. No. 4,644,347, entitled "Multiple Frequency Message System", issued Feb. 17, 1987, to Lucas et al. is, assigned to the same assignee as the present invention and is hereby incorporated by reference.

Figure 1:
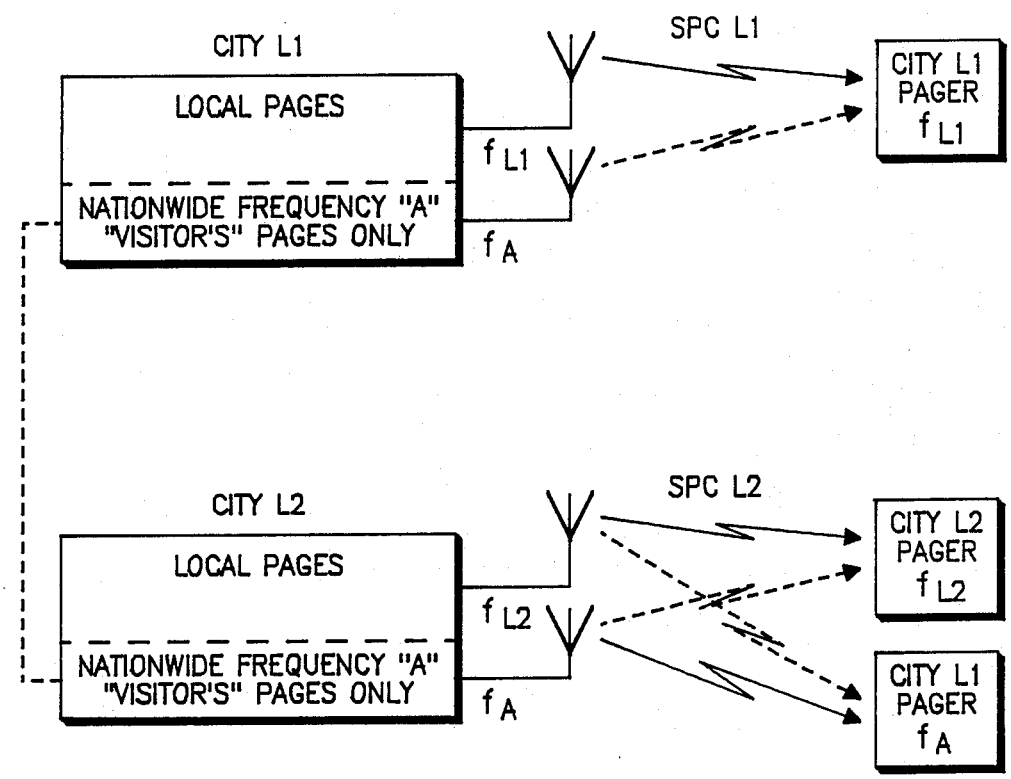
FIG. 1 is a block diagram illustrating the allocation of local pages and the nationwide pages on distinct communication frequencies in accordance with the preferred embodiment for the present invention.

Referring now to the drawings, wherein like reference numerals designate identical or corresponding parts throughout the several views, and more particularly to FIG. 1 thereof, a basic diagram of the transmitter/receiver system contemplated for a nationwide system is shown. In this system, a single frequency "$f_A$" is used at all transmitter sites throughout the nation for messages intended for users who are traveling; but by FCC restriction, the user's messages may not be transmitted on the nationwide frequency if the user is in the user's home or local city. Thus, a user of a local common carrier system who also subscribes to the nationwide system must have a receiver capable of receiving two frequencies: that of the user's "home city" for local pages and one of the proposed nationwide frequencies corresponding to the nationwide network to which the user belongs. In FIG. 1, only two cities or locations are shown and are indicated by L1 and L2. In city or location L1, the common carrier transmitters transmit local pages on frequency $f_{L1}$ and nationwide pages on $f_A$, while in city L2, local pages are transmitted on frequency $f_{L2}$ and nationwide pages on the common $f_A$.

In operation, a user in city L1 receives pages in that city on one of the channels used locally. This frequency $f_{L1}$ is determined by the user's choice of the RCC which services that city and also belongs to the nationwide system. When the user leaves city L1, he may report his absence to the local RCC which can then adjusts operations so that any pages originating for that particular user would be diverted to the nationwide system. The nationwide system would then be utilized to transmit the message in all cities or in a specific city, depending on the nature of the finally approved system. Thus, to avoid carrying more than one pager, the user's pager must also operate on frequency $f_A$, the nationwide frequency, whenever the user is out of his home or local system.

One approach to resolve the multichannel switching would be to have the pager user physically activate a switch to change the frequency of the pager when leaving the home or local system, but this requires the user to remember to take the appropriate action. However, it would be better to eliminate the requirement of user action to accomplish the frequency switching, if desired. The preferred method to accomplish the automatic frequency switching operation is to add information to the signaling used on the channel to indicate to the receiving pager whether it is in its home city or not in its home city. This would then permit automatic channel switching with identification on any AM or FM information modulation system, including the standard multifrequency and subcarrier FM broadcast scanning systems, as well as verifying correct manual switching.

It is clear that many types and formats of signal coding may be utilized for a system embodiment for present invention. Selective code signals always include an address code (ADR) to alert an individual pager device. To facilitate the nationwide system, a special code (SPC) is added to the signaling to identify the transmission as originating from a local or home city frequency. In FIG. 1, the transmission used in city L1 include special code SPC L1 for all transmissions, including transmissions on the nationwide system in city L1. The transmissions used in city L2 include special code SPC L2 for both types of transmissions. The term multifrequency or multichannel system is intended to include the two or more normal FM channels and any other AM or FM modulated information system in which switching may be in the form of scanning to detect information on one of the channels. Clearly, the present invention would also encompass reception of a single frequency or channel with the detection, decoding and display of the identification of the transmission source and hence the location of the pager.

While the preferred embodiment includes a paging receiver capable of reception of two or more communication frequencies, it should be clear that a single frequency pager could employ the present invention advantageously to identify proper operation in its identified "HOME" system or operation in another location. This would apply to systems in different locations which employ the same communication frequency. Thus, the inclusion of an encoded signal at each transmitter location to identify the source of transmissions and the reception, decoding and display of that information are basic to the present invention.

Assume a pager based in city L1 and programmed for that city, is turned on and initiates operation on the local frequency ($f_{L1}$) with the HOME city frequency being the turn-on or default condition. The pager samples the coding signals being transmitted, repetitively detects special code SPC L1, and therefore remains on the local frequency ($f_{L1}$). Now assume that the user of this pager travels to city L2, where, for purposes of simplicity, $f_{L2}$ may be the same frequency as $f_{L1}$. The pager now finds special code SPC L2 (i.e. the absence of code L1) in the transmissions and thus determines that it is not in city L1. The pager/receiver switches channels electronically to the nationwide frequency ($f_A$). On the nationwide frequency ($f_A$), the pager will also find special code SPC L2. If the pager had been operating on the nationwide frequency ($f_A$), and it detected special code SPC L1, it would conclude it was again in city L1 and would revert back to the local frequency ($f_{L1}$). In order to provide stability, each of the transmitters refreshes the system identification by transmitting its special code SPC at least once every few minutes and the pager frequency selection decision is set to occur after three consecutive positive detects. It will be appreciated by those skilled in the art that the time period and number of detects are arbitrary in the preferred embodiment as the system would work just as well with only one detect.

Figure 2:
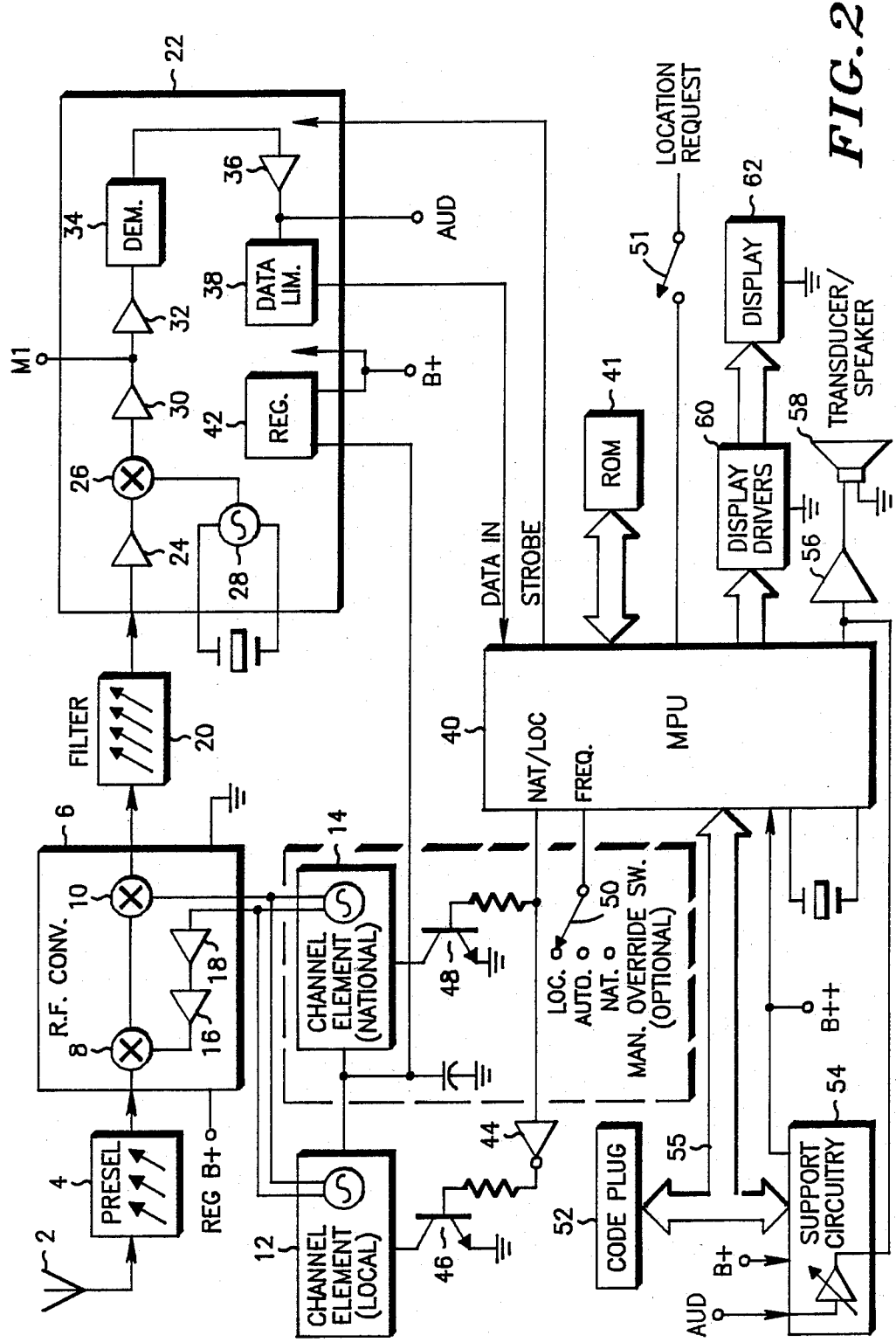
FIG. 2 is a functional block diagram of an embodiment for the receiver of the present invention.

Referring now to FIG. 2, the antenna 2 is shown connected to the preselector 4 which is comprised of a three pole filter and is used to pass signals of desired frequencies. The preselector 4 is connected to the RF converter 6 which is comprised of the series connected first and second mixers 8 and 10, the first mixer 8 being connected to the respective outputs of the local channel element 12 and national channel element 14 through the frequency multipliers 16 and 18 and the second mixer 10 being connected to respective outputs of the local channel element 12 and the national channel element 14. The local channel element 12 is tuned to the user's local designated frequency, while the national channel element 14 is tuned to one of the national paging frequencies. Therefore, the two channel elements 12 and 14 provide for the frequency selection through the RF converter 6. Each output of the channel elements 12 and 14 provides the necessary harmonics of the oscillator fundamental frequency to convert the incoming carrier frequency to a fixed intermediate frequency by the RF converter.

The output of the RF converter 6 is connected to a filter 20 which is used to filter the intermediate frequency signal from the RF converter. The output of the filter 20 is connected to the low conversion and detection circuitry 22 which includes the amplifier 24 having its output connected to an input of the mixer 26 having its other input connected to the oscillator 28. The output of the mixer 26 is connected to the series connected amplifier combination 30 and 32 which has its output connected to the demodulator 34. The output of the demodulator 34 is connected to the input of the amplifier 36 which amplifies the signal from the demodulator 34. The output of the amplifier 36 is connected to the input of the data limiter 38 which has its output connected to the data input port of the microprocessor 40. The channel elements 12 and 14 are driven by the regulated voltage from the voltage regulator 42 which is also included in the low frequency converter and detection circuitry 22. The low frequency converter and detection circuitry 22 is utilized to recover the modulation signal from the RF carrier wave, the operation of which is readily understandable to those skilled in the art.

The microprocessor 40 such as an MC146805E2 having an external read only memory 41 ROM manufactured by Motorola, Inc., includes a NATIONAL/LOCAL output port which is used to control the switching of the local channel element 12 and the national channel element 14. The NATIONAL/LOCAL output port of the microprocessor 40 is connected to the input of the local channel element 12 through the inverter 44 and NPN transistor 46 and also to the national channel element 14 input through the transistor 48. When the output of the NAT/LOC output port of the microprocessor 40 is at a 1 logic level, the collector of the transistor 46 is floating or in a high impedance state and the collector of the transistor 48 is at its saturation voltage (i.e. virtual RF ground) so that power is being supplied to the national channel element 14. However, when the NAT/LOC port is at a 0 logic level, the collector of the transistor 48 is floating or in a high impedance state and the collector of the transistor 46 is at virtual RF ground so that power is supplied to the local channel element 12 and the national channel element 14 is turned off. Two additional input ports of the microprocessor 40 may be connected to the optional manual override switch 50 which is used to manually select either the local frequency, the national frequency or the automatic selection of the proper frequency, as desired by the user. Channel element 14, transistor 48 and optional outside switch 50 are shown enclosed in a broken line box to show that the receiver of FIG. 2 could employ the present invention even if it were capable of receiving and decoding information on only one communication frequency. The normally NAT/LOC output part of microprocessor could be held at a fixed logic level of zero to ensure operation by the single local channel element 12. Also shown connected to microprocessor 40 is a location request switch 51. User actuation of this switch will start the determination and display of the status and location of the pager. The read only memory designated as a code plug 52 provides address information for the individual receiver as well as the local special code information for use by the microprocessor 40.

Microprocessor 40 is shown interconnected by means of a data bus to external ROM 41. ROM 41 contains the operating system software to enable full control operating sequence frequency selection, data decoding and display of information. The previously incorporated U.S. Pat. No. 4,644,347 includes detailed flow charts for the receiver operation. ROM 41 also contains information in the form of a table which relates detected special code signals to geographic location. As an example, SPC L1 might correspond to "MIAMI" and SPC L2 might correspond to "NEW YORK CITY" When a special code is detected and decoded, user actuation of switch 51 will cause the detected SPC to be compared with the home system SPC preferably stored in code plug 52.

In one embodiment, if the comparison shows identity, the display "HOME" would be presented confirming proper operation of the receiver and that it was in its home location. If the comparison is not identical, the display would be "NATIONWIDE" indicating that either the receiver was not in its home system or that there had been a malfunction of the receiver.

In another embodiment, after user actuation of switch 51, the detected and decoded SPC would be used to enter the SPC location table contained in ROM 41. When the appropriate geographic location had been determined, it would be displayed. In the previous example, a local pager for Miami in that geographic location would display "MIAMI", and if it were then subsequently relocated to New York City, would display "NEW YORK CITY". Thus, in either case, the pager user would have positive confirmation that his pager was on the right frequency and was decoding signals correctly.

The microprocessor 40 is coupled to and supplies signals to support circuitry 54 through data bus 55. The support circuitry 54 amplifies the audio signal from the low frequency converter and detection circuitry 22 to the amplifier 56 and transducer/speaker 58. The amplifier 56 is also connected to the output port of the microprocessor 40 which provides an alert output and amplifies the alert output to the transducer/speaker 58. The support circuitry 54 includes a "deadman" timer to prevent the microprocessor 40 from staying in an undetermined state in the event it gets lost. The support circuitry 54 also includes a DC to DC converter to supply the microprocessor 40, display driver 60 and display device 62 with the proper operating voltage. The support circuit 54 also monitors user inputs such as the volume control switch, on/off switch, the read page switch and provides information to the microprocessor 40 regarding the status of the aforesaid switches.

The microprocessor 40 is also connected to the input of the display driver 60 which is used to control the display device 62. The display device may be used to display the status of the receiver as to whether it is on the local channel, the national channel or searching for the appropriate channel to operate on. Another output port of the microprocessor 40 may be used to strobe the low frequency conversion and detection circuitry in the battery saver mode in order to consume less energy.

Figure 3A:
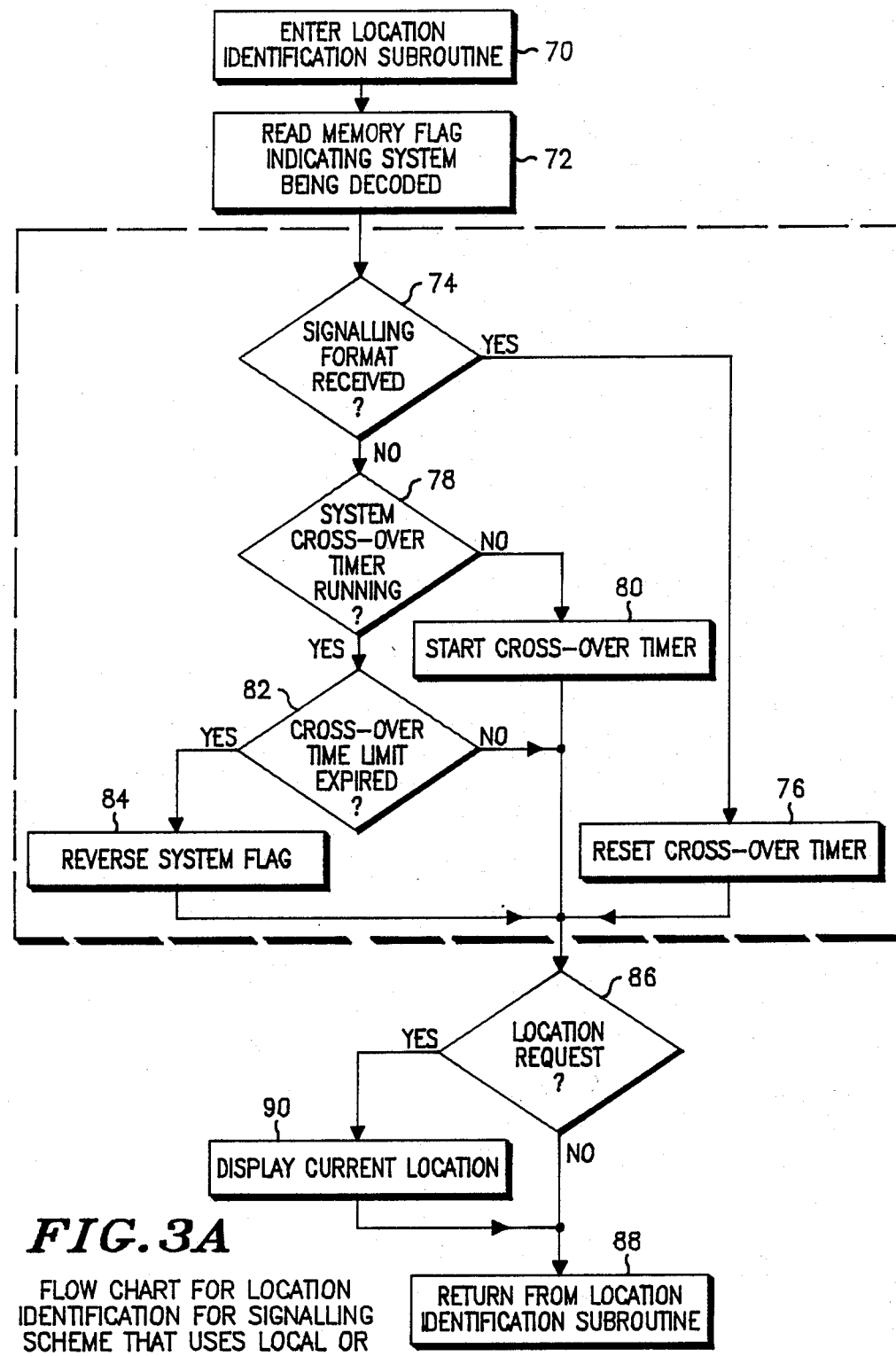
FIGS. 3A and 3B illustrate a flow chart for the location decoding and display operation of the microprocessor shown in FIG. 2.
Figure 3B:
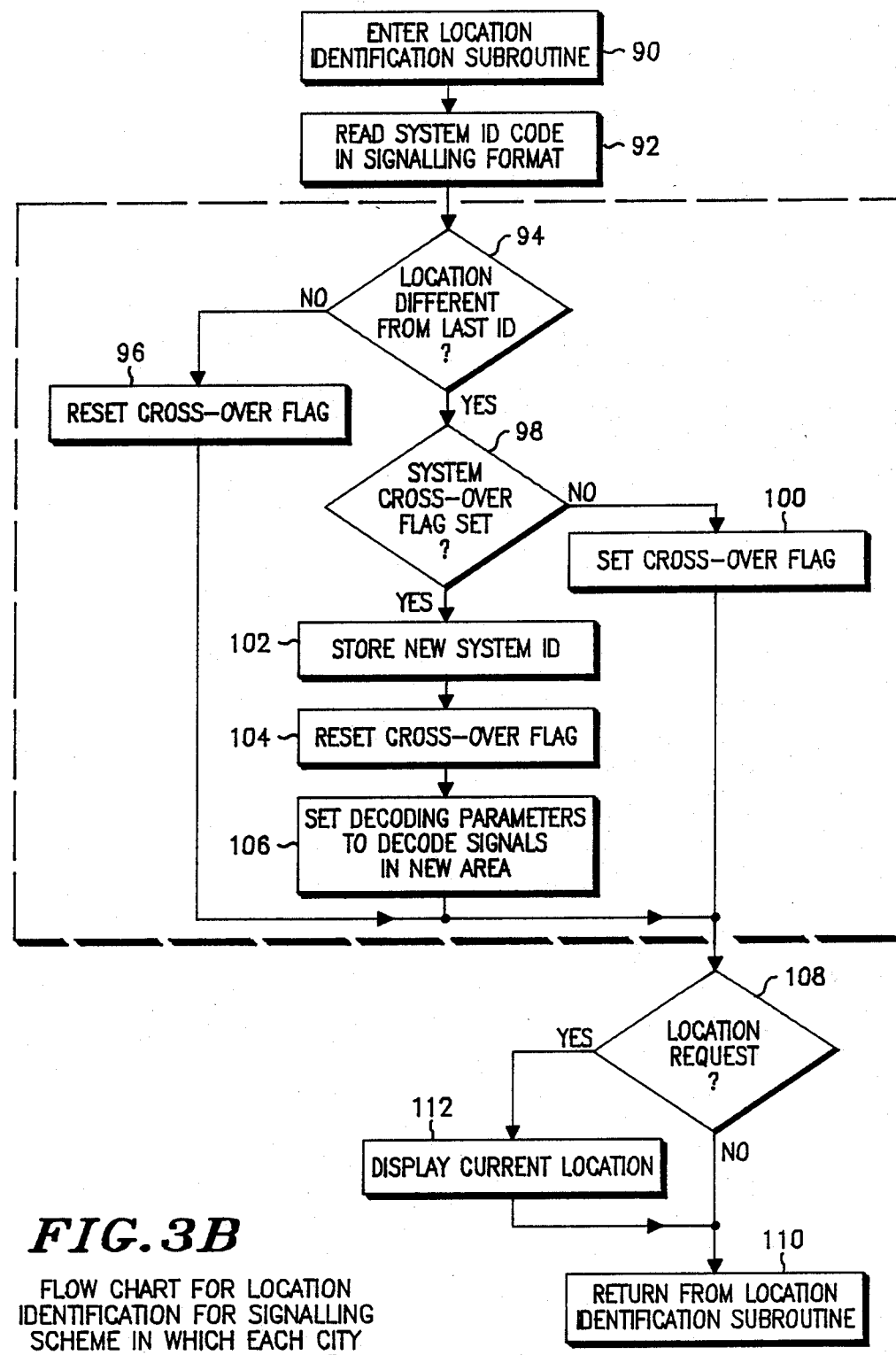

At a point in the operating system for the receiver, when the special code signal has been detected, a subroutine entitled Location Identification is entered. FIGS. 3A and 3B represent flow charts for the microprocessor operation during this subroutine. FIG. 3A shows the "HOME" and "NATIONWIDE" format while FIG. 3B shows the specific city identification. FIG. 3A shows that location identification subroutine is entered at block 70 after which, at block 72, the memory flag indicating the system currently being decoded is read. A decision block determining whether or not the signaling format is being received has a yes branch coupled to the instruction block 76 resetting cross over timer. The no branch from decision block 74 is coupled to a decision block 78 to determine whether the system cross over timer is currently running. The no branch of decision block 78 is coupled to the instruction block 80 to start the cross over timer. The yes branch of decision block 78 is coupled to decision block 82 which determines whether the cross over time limit is expired. The yes branch of decision block 82 is coupled to instruction block 84 which directs the system to reverse the system flag. Blocks 74–84 are shown enclosed in a broken line box to indicate that if a single frequency or a manual switching multifrequency system employing switch 50 were used, those operations would not be necessary to produce the display of the indicia identifying the location of the pager.

The output of instruction block 84, the no branch of decision block 82, instruction block 80, and instruction block 76 are coupled to decision block 86 which determines whether a location request has been made by the user. Location request decision block 86 is the logical equivalent of determining whether the operator has pressed a switch 51 for the pager to indicate the status and location of operation. The no branch of decision block 86 is coupled to instruction block 88 which directs the operating system to return to the main operating system from the location identification subroutine. The yes branch of decision block 86 is coupled to instruction block 90 which causes the display of the current location. This instruction block causes the microprocessor to take the currently decoded special code signal and determine whether this corresponds to the home system or nationwide system. After that determination has been made by comparison with information stored in code plug 52, the microprocessor initiates the display of the current location either as the designation "HOME" or "NATIONWIDE", depending upon the results of the comparison. There may be some standard time period for this display such as a few seconds, after which control is transferred to instruction block 88, to cause an exiting of the subroutine and a return to the main operating system.

FIG. 3B shows a block diagram of the location identification subroutine for an alternative embodiment which involves the identification of the individual cities in which the paging receiver is located. In a manner similar to FIG. 3A, the location identification subroutine is entered at instruction block 90 after which time instruction block 92 directs the system identification code in the signaling format to be read. Decision block 94 determines whether the current location is different from the last identification. The negative branch of decision block 94 is coupled to an instruction block 96 which resets the cross over flag. The positive branch of decision block 94 is coupled to decision block 98 which determines whether the system cross over flag has been set. The no branch of decision block 98 is coupled to an instruction block 100 to cause the cross over flag to be set. The yes branch of decision block 98, indicating that the system cross over flag has been set, transfers control to instruction block 102 which directs that the new system identification be stored. After storing the new system identification or location, the instruction block 104 directs the reset of the cross over flag and transfers control to instruction block 106 which sets the decoding parameters to decode signals in the new area. The new parameters may include a different address or different types of signaling systems for the new area. Blocks 94–106 are shown enclosed in a broken line box to indicate that if a single frequency or manual switching multifrequency system employing switch 50 were used, those operations would not be necessary to produce the display of the indicia identifying the location of the pager.

The output of instruction blocks 96 and 106 are coupled to decision block 108 which determines whether or not there has been a request for the location. This, as in the case for FIG. 3A, is a result of an operator actuation of switch 51 to determine whether or not the pager is functioning properly in response to the signaling system for the appropriate location in which it is currently positioned. The no branch of decision block 108 is coupled to an instruction block 110 which indicates a return to the main operating system program from the location identification subroutine. The yes branch of decision block 108 transfers control to instruction block 112 which causes the display of the current location. Instruction block 112 causes microprocessor 40 to take the currently decoded special code format signal and compare it with the location table contained in ROM 41 to determine the appropriate alphanumeric display which identifies the city corresponding to the current decoded location. Then the appropriate alphanumeric display is caused to be displayed in display 62. There may be some standard time period for this display such as a few seconds. Subsequent to the display, instruction block 112 transfers control to instruction block 110 to exit from the location identification subroutine and return to the operating system.

What is claimed is:

1. A selective call receiver for receiving and displaying transmitted coded message signals on a plurality of channels, said coded message signals including channel identification information identifying a source of transmission for each of said plurality of channels, said selective call receiver comprising:

detecting means for detecting transmitted coded message signals;
  decoding means responsive to said coded message signals for decoding said channel identification information;
  memory means containing a table including the channel identification information identifying each source of transmission for each of the plurality of channels, and further containing displayable location indicia corresponding thereto, and predetermined channel identification information identifying at least one predetermined channel;
  channel selecting means responsive to said decoding means for selecting the at least one predetermined channel when said decoded channel identification information is the same as said predetermined channel identification information, and further for selecting a second channel of the plurality of channels when said decoded channel identification is different than said predetermined channel identification information;
  comparison means, coupled to said memory means and said decoding means, for detecting identity between the decoded channel identification information and said stored channel identification information for identifying the transmission source on the selected channel in response thereto; and
  interrogation means, coupled to said comparison means, and accessible to the receiver user to cause the receiver to display said location indicia corresponding to the channel identification information received on the selected channel, thereby positively identifying the source of the coded message signal transmission.

2. The receiver of claim 1, further including timing means generating a periodic receiver time interval during which said channel identification information must be decoded and compared.

3. The receiver of claim 2, wherein said channel selecting means selects said first channel for receiving when said channel identification information decoded in said periodic receiver time interval on said second channel is the same as the first one of said predetermined channel identification information.

4. The receiver of claim 3, wherein said decoding and comparison must occur more than once during the periodic receiver time interval to confirm proper identification of the channel.

5. The receiver of claim 1, wherein said channel selecting means includes manual switching means accessible to the receiver user for selecting one channel for receiving from said at least two channels.

6. The receiver of claim 1, wherein said location indicia includes stored alphabetic information to positively identify the location corresponding to the transmission source of the selected channel.

7. A selective call receiver for receiving and displaying transmitted coded message signals on a plurality of channels, said coded message signals including channel identification information identifying a source of transmission for each of said plurality of channels, said selective call receiver comprising:

detecting means for detecting transmitted coded message signals;
  decoding means responsive to said coded message signals for decoding said channel identification information;
  memory means containing a table including the channel identification information identifying the source of transmission for each of the plurality of channels, and further containing displayable location indicia corresponding thereto;
  comparison means, coupled to said memory means and said decoding means, for detecting identity between the decoded channel identification information and said stored channel identification information for identifying the transmission source in response thereto; and interrogation means, coupled to said comparison means, and accessible to the receiver user to cause the receiver to display said location indicia corresponding to the channel identification information received on each of said plurality of channels, to positively identifying the source of the coded message signal transmission thereby indicating on which channel the receiver is receiving.

8. The receiver of claim 7, further including timing means generating a periodic receiver time interval during which said channel identification information must be decoded and compared.

9. The receiver of claim 8, wherein said decoding and comparison must occur more than once during the periodic receiver time interval to confirm proper identification of the channel.

10. The receiver of claim 9, wherein said location indicia includes stored alphabetic information to positively identify the location corresponding to the transmission source of the selected channel.

11. The receiver of claim 7, wherein said receiver is capable of receiving more than one channel and further includes manual switching means accessible to the receiver user for selecting one channel for receiving from said more than one channel.

12. A selective call receiver for receiving and displaying transmitted coded message signals on at least two channels, said coded message signals including channel identification information identifying a source of transmission for each of the channels, said selective call receiver comprising:

detecting means for detecting transmitted coded message signals;

decoding means responsive to said coded message signals for decoding said channel identification information;

memory means containing a table including the channel identification information identifying the source of transmission for each of the channels, and further containing alphabetic location indicia corresponding thereto, and predetermined channel identification information identifying at least one predetermined channel;

channel selecting means responsive to said decoding means for selecting the at least one predetermined channel when said decoded channel identification information is the same as said predetermined channel identification information, and further for selecting a second channel when said decoded channel identification information is different than said predetermined channel identification information, said channel selecting means further including timing means generating a periodic receiver time interval during which said channel identification information must be repetitively decoded and compared;

comparison means, coupled to said memory means and said decoding means, for detecting identity between the decoded channel identification information and said stored channel identification information for identifying the transmission source on the selected channel in response thereto; and interrogation means coupled to said comparison means, and accessible to the receiver user to cause the receiver to display said alphabetic location indicia corresponding to the channel identification information received on the selected channel, thereby positively identifying the transmission source of the coded message signal transmission.

13. The receiver of claim 12, further including manual switching means accessible to the receiver user for selecting one channel from said at least two channels for receiving.

* * * * *